United States Patent
Wang et al.

(10) Patent No.: US 11,323,622 B2
(45) Date of Patent: May 3, 2022

(54) GIMBAL, METHOD AND APPARATUS FOR CONTROLLING PHOTOGRAPHING APPARATUS

(71) Applicant: SZ DJI TECHNOLOGY CO., LTD., Shenzhen (CN)

(72) Inventors: Zhendong Wang, Shenzhen (CN); Xieping Wang, Shenzhen (CN); Zhiyong Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/111,540

(22) Filed: Dec. 4, 2020

(65) Prior Publication Data
US 2021/0092294 A1     Mar. 25, 2021

Related U.S. Application Data

(63) Continuation of application No. PCT/CN2019/095385, filed on Jul. 10, 2019.

(51) Int. Cl.
*H04N 5/232* (2006.01)
*H04N 5/225* (2006.01)

(52) U.S. Cl.
CPC ....... *H04N 5/23245* (2013.01); *H04N 5/2253* (2013.01); *H04N 5/23206* (2013.01)

(58) Field of Classification Search
CPC ............ H04N 5/23245; H04N 5/2253; H04N 5/23206; H04N 5/23241; H04N 5/23299;
(Continued)

(56) References Cited

U.S. PATENT DOCUMENTS

| | | | |
|---|---|---|---|
| 2015/0109470 A1* | 4/2015 | Yang | G05B 15/02 348/211.9 |
| 2016/0306420 A1 | 10/2016 | Hill, III | |

(Continued)

FOREIGN PATENT DOCUMENTS

| | | |
|---|---|---|
| CN | 1160970 A | 10/1997 |
| CN | 101478666 A | 7/2009 |

(Continued)

OTHER PUBLICATIONS

Anonymous: "AK4000 Gimbal Manual—JP", Dec. 1, 2018 (Dec. 1, 2018), pp. 1-25, XP055819484, Retrieved from the Internet: https://cdn1.feiyu-tech.com/download/20190926/AK4000_Manual_jp.pdf, [retrieved on Jul. 25, 2021].

(Continued)

*Primary Examiner* — Padma Haliyur
(74) *Attorney, Agent, or Firm* — Fideli Law PLLC

(57) ABSTRACT

A gimbal and a control method and apparatus for a photographing apparatus are provided. The photographing apparatus is mounted on a gimbal. When a communication link between the photographing apparatus and the gimbal is in an active state, the photographing apparatus is controlled by the gimbal. The method includes: detecting a first indication signal; and switching the communication link between the gimbal and the photographing apparatus from an active state to an inactive state, so that the photographing apparatus can be controlled autonomously. When the first indication signal is detected, the communication link between the gimbal and the photographing apparatus is switched from the active state to the inactive state, so that the photographing apparatus can restore to an autonomous control mode without physical plugging or unplugging or manual disabling of a wireless connection function in settings, helping a user to operate various functions.

18 Claims, 5 Drawing Sheets

(58) Field of Classification Search
CPC ............ H04N 5/23203; H04N 5/2257; H04N 5/23296; G03B 2206/00; G03B 17/561
See application file for complete search history.

(56) References Cited

U.S. PATENT DOCUMENTS

| | | | | |
|---|---|---|---|---|
| 2017/0010611 | A1* | 1/2017 | Tao | G06F 3/147 |
| 2017/0037995 | A1* | 2/2017 | Pan | G03B 17/561 |
| 2017/0198747 | A1* | 7/2017 | Chen | H04N 5/2328 |
| 2019/0215457 | A1* | 7/2019 | Enke | H04N 5/23258 |

FOREIGN PATENT DOCUMENTS

| | | |
|---|---|---|
| CN | 102789187 A | 11/2012 |
| CN | 105721820 A | 6/2016 |
| CN | 205657746 U | 10/2016 |
| CN | 107094368 A | 8/2017 |
| CN | 107800943 A | 3/2018 |
| CN | 107846553 A | 3/2018 |
| CN | 207292469 U | 5/2018 |
| CN | 108234871 A | 6/2018 |
| CN | 108375992 A | 8/2018 |
| CN | 108490964 A | 9/2018 |
| CN | 108496137 A | 9/2018 |
| CN | 108632524 A | 10/2018 |
| CN | 108958351 A | 12/2018 |
| CN | 109068090 A | 12/2018 |
| CN | 109151392 A | 1/2019 |
| JP | 2008141704 A | 6/2008 |
| JP | 2010283598 A | 12/2010 |
| JP | 2016213535 A | 12/2016 |
| KR | 100862398 B1 | 10/2008 |
| KR | 200475741 Y1 | 12/2014 |

OTHER PUBLICATIONS

Anonymous: "AK4000—3-Axis Stabilized Handheld Gimbal for Camera—Instructions", Aug. 20, 2019 (Aug. 20, 2019), pp. 1-30, XP055819637, Retrieved from the Internet: URL: https://cdn1.feiyu-tech.com/dl/manual/AK4000_Manual_en.pdf, [retrieved on Jul. 25, 2021].

Anonymous: "Download—AK4000—FeiyuTech", Aug. 20, 2019 (Aug. 20, 2019), pp. 1-6, XP055819486, Retrieved from the Internet: URL: https://www.feiyu-tech.com/ak4000/down, [retrieved on Jul. 25, 2021].

Anonymous: "OSMO Mobile 2 User Manual", Nov. 7, 2018 (Nov. 7, 2018), pp. 1-19, XP055819487, Retrieved from the Internet: URL: https://dl.djicdn.com/downloads/Osmo+Mobile+2/20181107/Osmo_Mobile_2_User_Manual_EN.pdf, [retrieved on Jul. 25, 2021].

International Search Report of PCT/CN2019/095385 (dated Mar. 25, 2020).

* cited by examiner

GIMBAL, METHOD AND APPARATUS FOR CONTROLLING PHOTOGRAPHING APPARATUS

RELATED APPLICATIONS

This application is a continuation application of PCT application No. PCT/CN2019/095385, filed on Jul. 10, 2019, and the content of which is incorporated herein by reference in its entirety.

TECHNICAL FIELD

The present disclosure relates to the field of photographing apparatus control, and in particular, to a gimbal, a method and apparatus for controlling a photographing apparatus.

BACKGROUND

As sensor technology advances and our living standards are greatly improved, photographing apparatuses such as single-lens reflex cameras or mirrorless interchangeable-lens cameras to record details of life become more and more popular. Generally, a user may swing a lot when walking, and images captured with a photographing apparatus during walking are shaky. In order to obtain better image quality, the photographing apparatus is usually equipped with a gimbal to assist the photographing.

Usually, the gimbal is connected to the photographing apparatus by a shutter release or in a wireless manner, so that the gimbal can control the photographing apparatus. When the photographing apparatus is controlled by a gimbal, it is in a PC connection mode and cannot be autonomously controlled (when the photographing apparatus is in an autonomous control mode, a user can operate the photographing apparatus through a key on a body of the photographing apparatus). Consequently, the user cannot operate a key(s) on the body of the photographing apparatus to review images, check parameters of the photographing apparatus, and the like. In this case, the shutter release connecting the photographing apparatus and the gimbal needs to be disconnected, or a wireless connection function in the settings (settings of the gimbal or settings of the photographing apparatus) needs to be manually disabled, so that the photographing apparatus returns to the autonomous control mode, and the user can operate the key(s) on the body of the photographing apparatus to review images, check parameters of the photographing apparatus, and the like. The foregoing operation is cumbersome, and its user experience is poor.

SUMMARY

The present disclosure provides a gimbal and a control method and apparatus for a photographing apparatus.

According to a first aspect of the present disclosure, a control method for a photographing apparatus is provided, including: detecting a first indication signal; and switching a communication link between a gimbal and the photographing apparatus mounted on the gimbal from an active state to an inactive state to allow the photographing apparatus to be autonomously controlled, where, in the active state, the photographing apparatus is controlled by the gimbal.

According to a second aspect of the present disclosure, a control apparatus for a photographing apparatus is provided, including: at least one storage medium storing a set of instructions for controlling a photographing apparatus; and at least one processor in communication with the at least one storage medium, wherein during operation, the at least one processor executes the set of instructions to: detect a first indication signal; and switch a communication link between a gimbal and the photographing apparatus mounted on the gimbal from an active state to an inactive state to allow the photographing apparatus to be autonomously controlled, where, in the active state, the photographing apparatus is controlled by the gimbal.

According to a third aspect of the present disclosure, a gimbal is provided, including: a carrying part to mount a photographing apparatus; a shaft assembly to secure the carrying part; and a controller in communication with the shaft assembly, where the controller is configured to: detect a first indication signal, and switch a communication link between a gimbal and the photographing apparatus mounted on the gimbal from an active state to an inactive state to allow the photographing apparatus to be autonomously controlled, where, in the active state the photographing apparatus is controlled by the gimbal, and the gimbal communicates with the photographing apparatus through the controller communicating with the photographing apparatus.

It can be learned from the foregoing technical solutions provided in embodiments of the present disclosure, in the present disclosure, when the first indication signal is detected, the communication link between the gimbal and the photographing apparatus is switched from the active state to the inactive state, so that in a process in which the gimbal is used for controlling the photographing apparatus process, the photographing apparatus can restore to an autonomous control mode without physical plugging or unplugging or manual disabling of a wireless connection function in settings, helping a user operate a key on a body of the photographing apparatus to review, or view a parameter of the photographing apparatus, or the like in a process of controlling the photographing apparatus by using the gimbal, thereby giving favorable operation and control experience to the user.

BRIEF DESCRIPTION OF THE DRAWINGS

In order to describe the technical solutions in the embodiments of the present disclosure more clearly, the accompanying drawings for describing the embodiments will be briefly described below. Apparently, the accompanying drawings described below are only some exemplary embodiments of the present disclosure. A person of ordinary skill in the art may further obtain other accompanying drawings based on these accompanying drawings without creative efforts.

Figure 1:
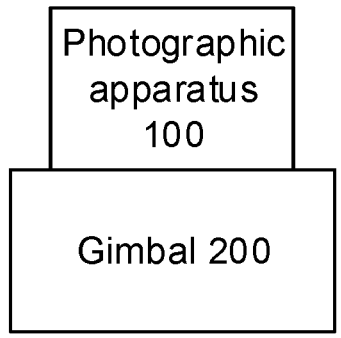
FIG. 1 is a schematic structural diagram of a control system for a photographing apparatus according to some exemplary embodiments of the present disclosure.

Reference numerals: 100: photographing apparatus; 200: gimbal; 210: shaft assembly; 220: controller; 230: first control part; and 240: second control part.

DETAILED DESCRIPTION

Currently, a gimbal is usually connected to a photographing apparatus through a shutter release, so that the gimbal can control the photographing apparatus. Alternatively, a gimbal may be connected to a photographing apparatus in a wireless communication manner, so that the gimbal can control the photographing apparatus. When the photographing apparatus is controlled by the gimbal, the shutter release needs to be disconnected, or a wireless connection function in the settings needs to be manually disabled, in order to disconnect the communication between the gimbal and the photographing apparatus, so that the photographing apparatus restores to an autonomous control mode, and a user can operate a key(s) on a body of the photographing apparatus for reviewing images, or checking parameters of the photographing apparatus, and the like. The operation in this manner is cumbersome, and the user experience is poor.

Therefore, in the present disclosure, when a first indication signal is detected, a communication link between the gimbal and the photographing apparatus is switched from an active state to an inactive state, so that in a process in which the gimbal is used for controlling the photographing apparatus, the photographing apparatus can restore to the autonomous control mode without physical plugging or unplugging or manual disabling of a wireless connection function in the settings, helping a user operate a key(s) on a body of the photographing apparatus to review images, or check parameters of the photographing apparatus, and the like in a process of controlling the photographing apparatus with the gimbal, thereby providing good operation and control experience to the user.

The following clearly and fully describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the scope of protection of the present disclosure.

It should be noted that, if there is no conflict, the following embodiments and features in implementations may be combined with each other.

Referring to FIG. 1, a photographing apparatus 100 of some exemplary embodiments of the present disclosure is mounted on a gimbal 200. It should be noted that, in some exemplary embodiments of the present disclosure, the photographing apparatus 100 may be a photographing apparatus that can be independently controlled for photographing such as a camera or a video camera.

The gimbal 200 includes a carrying part and a shaft assembly. The carrying part is configured to carry the photographing apparatus 100. The photographing apparatus 100 may be mounted on the carrying part in a detachable connection manner. The shaft assembly is configured to secure the carrying part. Posture control of the photographing apparatus 100 may be achieved through the shaft assembly. In some examples, the gimbal 200 may be a two-axis gimbal, and the shaft assembly includes two of a yaw shaft assembly, a pitch shaft assembly, and a roll shaft assembly. In some examples, the gimbal 200 may be a three-axis gimbal, and the shaft assembly includes a yaw shaft assembly, a pitch shaft assembly, and a roll shaft assembly. In some examples, the yaw shaft assembly may include a yaw motor, the pitch shaft assembly may include a pitch axis arm and a pitch motor, and the roll shaft assembly may include a roll axis arm and a roll motor. One end of the roll axis arm is connected to a rotator of the yaw motor, and the other end thereof is connected to a stator of the roll motor. One end of the pitch axis arm is connected to a rotator of the roll motor, and the other end thereof is connected to a stator of the pitch motor. A rotator of the pitch motor is connected to the carrying part. To implement a posture change of the photographing apparatus 100, at least one of the following control strategies may be employed: controlling the yaw motor to rotate around a yaw axis, controlling the roll motor to rotate around a roll axis, and controlling the pitch motor to rotate around a pitch axis. In addition, the gimbal 200 in some exemplary embodiments may be a handheld gimbal, or may be a non-handheld gimbal. In a feasible embodiment, the gimbal 200 is a handheld gimbal, the gimbal further includes a handle, and the shaft assembly is mounted on a top portion of the handle.

Figure 2:
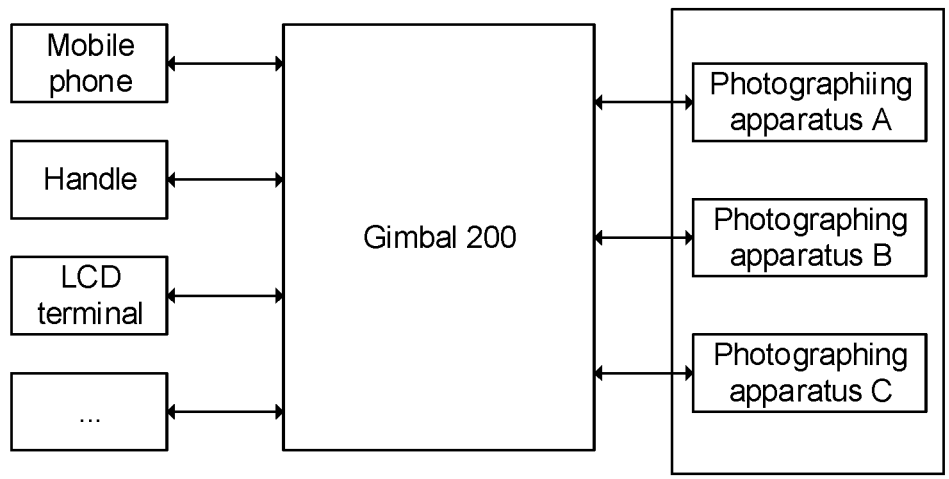
FIG. 2 is a diagram of an application scenario of a control system for a photographing apparatus according to some exemplary embodiments of the present disclosure.

It may be understood that, the gimbal 200 may support different types of photographing apparatuses. As shown in FIG. 2, the gimbal 200 may respectively control a photographing apparatus A, a photographing apparatus B, and a photographing apparatus C. It should be noted that, in some exemplary embodiments of the present disclosure, the gimbal 200 can carry one photographing apparatus 100 at a time.

In some exemplary embodiments, the gimbal 200 is a handheld gimbal, and a user can control the photographing apparatus 100 by using a handle.

In some exemplary embodiments, the gimbal 200 may communicate with an external device. The external device can indirectly control the photographing apparatus 100 through the transfer of the gimbal 200. The external device may include a remote control, a smart mobile terminal (a mobile phone, a tablet computer, or the like), a liquid crystal display (LCD) terminal, or another smart terminal.

There is at least one communication link between the photographing apparatus 100 and the gimbal 200. The communication link may include at least one of a wired communication link and a wireless communication link. In some examples, the photographing apparatus 100 and the gimbal 200 are connected in a wired manner to implement the communication, for example, by using a shutter release. In some examples, the photographing apparatus 100 and the gimbal 200 are connected in a wireless manner to implement the communication, for example, through Bluetooth, Wi-Fi, or infrared. In some exemplary embodiments, when the communication link between the photographing apparatus 100 and the gimbal 200 is in an active state, the photographing apparatus 100 is controlled by the gimbal 200. In this case, the photographing apparatus 100 is in a PC connection mode. The function of a key on a body of the photographing apparatus 100 is restricted, and a user cannot control the photographing apparatus 100 by operating the key on the body. When the communication link between the photographing apparatus 100 and the gimbal 200 is in an inactive state, the photographing apparatus 100 may be autonomously controlled. In this case, the photographing apparatus 100 is in an autonomous control mode. The function of the key on the body is not restricted, and a user can control the photographing apparatus 100 by operating the key on the body.

It may be understood that, the gimbal 200 in some exemplary embodiments of the present disclosure may alternatively be replaced with another control apparatus for a photographing apparatus that can carry the photographing apparatus 100 and control the photographing apparatus 100.

Figure 3:
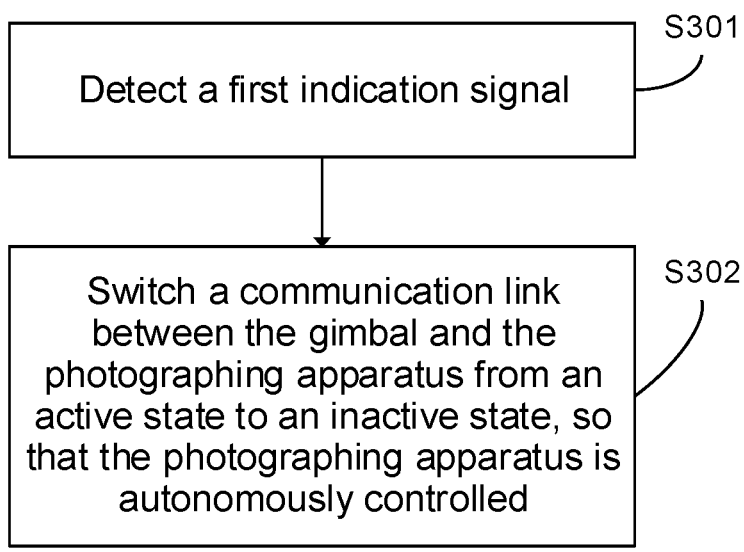
FIG. 3 is a method flowchart of a control method for a photographing apparatus according to some exemplary embodiments of the present disclosure.

FIG. 3 is a method flowchart of a control method for a photographing apparatus according to some exemplary embodiments of the present disclosure. The control method for the photographing apparatus may be performed by a gimbal controller, or an independent controller disposed on the gimbal 200. As shown in FIG. 3, the control method for the photographing apparatus may include the following steps:

S301: Detect a first indication signal.

In some exemplary embodiments, a first indication signal is sent by an external device, and the external device can communicate with the gimbal 200. The external device is provided with a virtual or physical control part. When the control part is triggered, the external control device sends the first indication signal to the gimbal 200. In some examples, the external device is a mobile phone, and the mobile phone is provided with an application (APP) that can communicate with the gimbal 200. The APP has a button, and when a user operates the virtual button, the APP generates a first indication signal and sends the first indication signal to the gimbal 200. In some examples, the external device is a mouse that can communicate with the gimbal 200. When at least one of a left button, a right button, and a scroll wheel of the mouse is operated, the mouse generates a first indication signal, and sends the first indication signal to the gimbal 200.

In some exemplary embodiments, the gimbal 200 includes a first control part, and the first indication signal is generated when the first control part is triggered. The first control part may be one of a key, a button, and a knob. For example, the first control part is a key, and when a user presses the first control part, the first control part generates the first indication signal. In some examples, the gimbal 200 is a handheld gimbal, and the first control part is disposed on a handle thereof.

S302: Switch a communication link between the gimbal 200 and the photographing apparatus 100 from an active state to an inactive state, so that the photographing apparatus 100 can be autonomously controlled.

In the case where a user uses the gimbal 200 to control the photographing apparatus 100, when the user needs to operate a key on a body of the photographing apparatus 100 to control the photographing apparatus 100, the photographing apparatus 100 can be switched from the PC connection mode to the autonomous control mode through a one-key operation by means of operating the external device or the first control part. This operation process is simple, convenient, and quick.

A port on the gimbal 200 for connection to the photographing apparatus 100 may be set to be an inactive port. For example, when an enable end of the port is at a high level, the port is an active port; when the enable end of the port is at a low level, the port is an inactive port. In this case, an input level of the enable end of the port may be lowered to switch the communication link between the gimbal 200 and the photographing apparatus 100 from the active state to the inactive state. Certainly, the communication link between the gimbal 200 and the photographing apparatus 100 may also be switched from the active state to the inactive state in another manner.

In some exemplary embodiments, the first indication signal is used for instructing the gimbal 200 to switch from a first state to a second state. For example, the first state is a wake-up state, and the second state is a sleep state. Certainly, the first state and the second state may alternatively be other states of the gimbal 200. In some exemplary embodiments, that the first state is a wake-up state and the second state is a sleep state is used as an example for description.

In some examples, the gimbal 200 includes a main controller central processing unit (CPU), a memory, and an external circuit (such as a signal amplification circuit, a communication circuit, etc.). The main controller CPU is electrically coupled to the memory and the external circuit respectively.

It should be noted that, when the gimbal 200 is in the wake-up state, the main controller CPU, the memory, and the external circuit are all in a power-on operation state, the memory can exchange data with the external circuit, and the gimbal 200 can control the photographing apparatus 100 to perform photographing/video recording, or the like.

When the gimbal 200 is in the sleep state, the main controller CPU is in a power-off state, that is, the main controller CPU does not consume power; the memory is in a self-refreshing state; and a non-wake-up part(s) of the external circuit may be powered off, and the gimbal 200 needs to be waked up to control the photographing apparatus 100 to perform photographing/video recording, or the like. In the sleep state, the wake-up state of the gimbal 200 (that is, the wake-up state when the gimbal 200 enters the sleep state) is saved. Once a hardware event (such as a key press) occurs, the gimbal 200 can immediately restore to the saved wake-up state.

When the gimbal 200 is in the sleep state, if the communication link between the gimbal 200 and the photographing apparatus 100 is still active, the photographing apparatus 100 is prevented from entering the sleep state/being powered off, causing the photographing apparatus 100 to consume power. In some exemplary embodiments, when the gimbal 200 is switched from the wake-up state to the sleep state, the communication link between the gimbal 200 and the photographing apparatus 100 is switched from the active state to the inactive state, and the photographing apparatus 100 automatically enters the sleep state/is powered off after a certain period of time without control, thereby reducing the power consumption of the photographing apparatus 100.

In some examples, the gimbal 200 is provided with a sleep key, and the first indication signal is generated when the sleep key is triggered. In the embodiment shown in FIG. 4, when the gimbal 200 is in the wake-up state, the photographing apparatus 100 is in the PC connection mode. When the sleep key is single-clicked, the sleep key generates the first indication signal, to switch the communication link between the gimbal 200 and the photographing apparatus 100 from the active state switch to the inactive state, so that the photographing apparatus 100 is switched from the PC connection mode to the autonomous control mode, and the gimbal 200 is switched from the wake-up state to the sleep state.

In some exemplary embodiments, the first indication signal is used for instructing to lock the photographing apparatus 100 to a current operation of the photographing apparatus 100. That is, the first indication signal is a signal for enabling a lock function. In this case, a user operates the gimbal 200, and the gimbal 200 can generate data, but does not transmit the generated data to the photographing apparatus 100 through the communication link between the gimbal 200 and the photographing apparatus 100. The gimbal 200 is locked, so that the photographing apparatus 100 is locked in the PC connection mode, and the photographing apparatus 100 is locked to the current operation.

When the gimbal 200 performs the lock function to lock the photographing apparatus 100 to the current operation of the photographing apparatus 100, if the communication link between the gimbal 200 and the photographing apparatus 100 is still active, the lock may fail due to an operation that accidentally triggers a shutter. In some exemplary embodiments, when the gimbal 200 performs the lock function to lock the photographing apparatus 100 to the current operation of the photographing apparatus 100, the communication link between the gimbal 200 and the photographing apparatus 100 is switched from the active state to the inactive state. As a result, even if the shutter of the gimbal 200 is accidentally triggered during locking of the photographing apparatus 100 by the gimbal 200, the photographing apparatus 100 is still locked to the current operation, bringing favorable experience to a user.

In some examples, the gimbal 200 is provided with a lock key, and the first indication signal is generated when the lock key is triggered. In the embodiment shown in FIG. 5, when the lock function of the gimbal 200 is turned off, the photographing apparatus 100 is in the PC connection mode. When the lock key is single-clicked, the lock key generates the first indication signal. The communication link between the gimbal 200 and the photographing apparatus 100 is switched from the active state to the inactive state, so that the photographing apparatus 100 is locked in the PC connection mode, and the gimbal 200 is locked.

The current operation includes video recording or photographing. In some exemplary embodiments, the gimbal 200 may be used to lock the photographing apparatus 100 to a video recording operation or a photographing operation. In addition, even if a user accidentally triggers a shutter operation of the gimbal 200, the photographing apparatus 100 does not exit the currently locked operation. It may be understood that, the current operation may alternatively be another operation.

Further, when the first indication signal is used for instructing to lock the photographing apparatus 100 to the current operation of the photographing apparatus 100, the control method for the photographing apparatus further includes: when the first indication signal is detected, prohibiting the photographing apparatus 100 from performing an operation other than the current operation, so as to ensure that the photographing apparatus 100 is locked to the current operation. The another operation may include an operation such as parameter setting/viewing or video/picture reviewing other than video recording and photographing. Still further, after the detecting of the first indication signal, and prior to the prohibiting of the photographing apparatus 100 from performing an operation other than the current operation, the control method for the photographing apparatus further includes: saving current state information of the photographing apparatus 100, to help the gimbal 200 restore state information of the photographing apparatus 100 to the saved current state information after the current lock of the photographing apparatus 100 is released. The current state [A1][A2] information may include a photographing mode, a video recording mode, or the like of the photographing apparatus 100.

In some exemplary embodiments, there are at least two communication links between the gimbal 200 and the photographing apparatus 100, and the communication connection between the gimbal 200 and the photographing apparatus 100 is based on one of the communication links. In some examples, the communication links between the gimbal 200 and the photographing apparatus 100 include a first communication link and a second communication link. The first indication signal is used for instructing to switch the communication link between the gimbal 200 and the photographing apparatus 100 from the first communication link to the second communication link. In some examples, the first communication link is one of a wired communication link and a wireless communication link, and the second communication link is the other one of the wired communication link and the wireless communication link. In some examples, the first communication link and the second communication link are both wireless communication links. For example, the first communication link is a Wi-Fi link, and the second communication link is a Bluetooth link.

Figure 6:
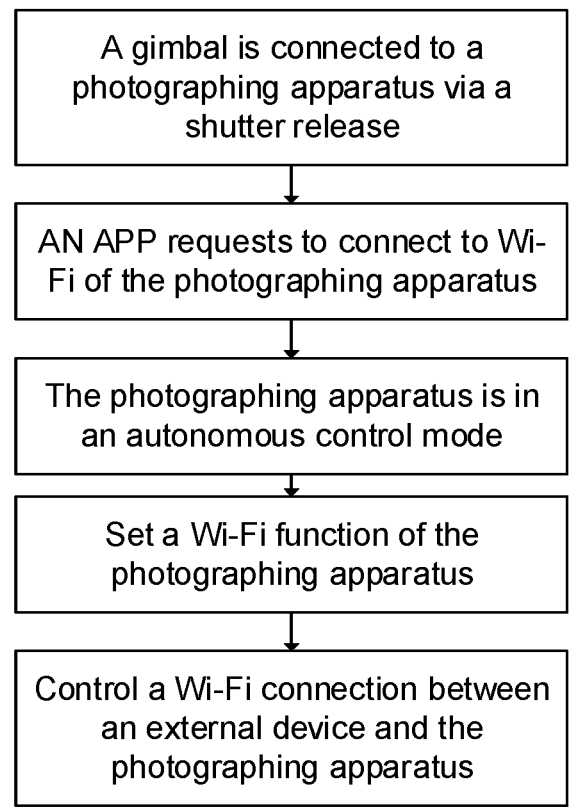
FIG. 6 is a method flowchart of a control method for a photographing apparatus according to another embodiment of the present disclosure.

In the embodiment shown in FIG. 6, the gimbal 200 is connected to the photographing apparatus 100 through a shutter release. When an APP requests to connect to the Wi-Fi of the photographing apparatus 100 (that is, the first indication signal), the communication link between the gimbal 200 and the photographing apparatus 100 is switched from the active state to the inactive state, so that the photographing apparatus 100 is switched from the PC connection mode to the autonomous control mode.

In a feasible embodiment, the first communication link is a wired communication link, and the second communication link is a wireless communication link. Further, the control method for the photographing apparatus in some exemplary embodiments further includes: connecting the photographing apparatus 100 and an external device through the wireless communication link, that is, directly connecting the photographing apparatus 100 and the external device through the wireless communication link, thereby helping the photographing apparatus 100 transmit an image/a video to the external device.

That the wireless communication link is Wi-Fi is used as an example. As shown in FIG. 6, the connecting the photographing apparatus 100 and an external device through the wireless communication link may include the following two operating steps:

(1). Set a Wi-Fi function of the photographing apparatus 100. This step can enable built-in Wi-Fi of the photographing apparatus 100.

(2). Control a Wi-Fi connection between the external device and the photographing apparatus 100.

Connecting to the external device through the built-in Wi-Fi of the photographing apparatus 100 can accelerate data transmission between the photographing apparatus 100 and the external device.

In another feasible embodiment, the first communication link is a wireless communication link, and the second communication link is a wired communication link.

For the existing switch of the communication link between the gimbal 200 and the photographing apparatus 100, when a wired communication link is being switched to a wireless communication link, a connection line of the wired connection, such as a shutter release, needs to be disconnected, and then the gimbal 200 is connected to the photographing apparatus 100 again through Wi-Fi, Bluetooth, infrared, or another wireless connection manner. When switching from the current wireless communication link to a wired communication link or another wireless communication link, a wireless connection function corresponding to the current wireless communication link in the settings needs to be manually disabled, thus the current wireless communication link between the gimbal 200 and the photographing apparatus 100 is disconnected, and then the shutter release is manually connected again to the gimbal 200 and the photographing apparatus 100, or a wireless connection function corresponding to another wireless communication link in the settings is manually enabled, so that the gimbal 200 and the photographing apparatus 100 switches from the current wireless communication link to a wired communication link or a different wireless communication link. The foregoing switching process is relatively complex, and the existing communication link between the gimbal 200 and the photographing apparatus 100 cannot be automatically switched. In some exemplary embodiments, when the first indication signal that is used for instructing to switch the communication link between the gimbal 200 and the photographing apparatus 100 from the first communication link to the second communication link is detected, the communication link between the gimbal 200 and the photographing apparatus 100 is switched from the active state to the inactive state, and the communication link between the gimbal 200 and the photographing apparatus 100 can be switched without physical plugging or unplugging, or manual disabling of the wireless connection function in settings, making the switching of the communication link between the gimbal 200 and the photographing apparatus 100 easier and quicker.

In the case where the first indication signal is generated to instruct the gimbal 200 to switch from the first state to the second state, or instruct to switch the communication link between the gimbal 200 and the photographing apparatus 100 from the first communication link to the second communication link, the control method for the photographing apparatus further includes: when the first indication signal is detected, unloading at least a drive of the photographing apparatus 100 and a drive of the gimbal 200, so that the gimbal 200 is disconnected from the photographing apparatus 100. By means of the foregoing operation, a software connection between the gimbal 200 and the photographing apparatus 100 can be unloaded, thereby ensuring that the gimbal 200 is fully disconnected from the photographing apparatus 100. Further, after the detecting of the first indication signal, and prior to the unloading of the drives of the photographing apparatus 100 and the gimbal 200, the control method for the photographing apparatus further includes: resetting the photographing apparatus 100 to preset state information. The preset state information is the state information of the photographing apparatus 100 that is obtained before least time the gimbal 200 loads the photographing apparatus 100. The preset state information may be state information of the photographing apparatus 100 that is often used by a user, thereby helping the user operate the photographing apparatus 100. Certainly, the preset state information may alternatively be set as other information according to a user's requirement.

Figure 7:
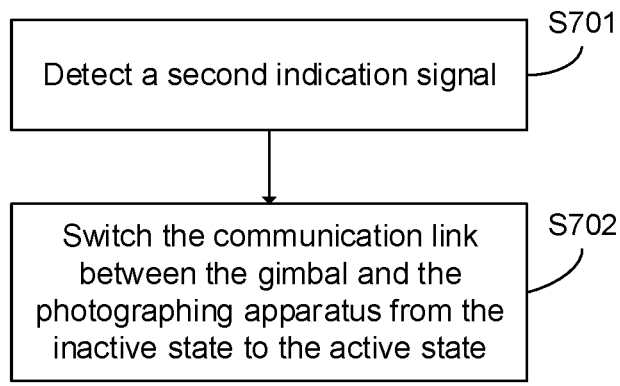
FIG. 7 is a method flowchart of a control method for a photographing apparatus according to another embodiment of the present disclosure.

FIG. 7 is a method flowchart of a control method for a photographing apparatus according to another embodiment of the present disclosure. As shown in FIG. 7, the control method for the photographing apparatus may further include the following steps:

S701: Detect a second indication signal.

In some exemplary embodiments, the second indication signal is sent by an external device, and the external device can communicate with the gimbal 200. The external device is provided with a virtual or physical control part. When the control part is triggered, the external control device sends the second indication signal to the gimbal 200. In some examples, the external device is a mobile phone, and the mobile phone is provided with an APP that can communicate with the gimbal 200. The APP has a button, and when a user operates the virtual button, the APP generates a second indication signal and send the second indication signal to the gimbal 200. In some examples, the external device is a mouse that can communicate with the gimbal 200. When at least one of a left button, a right button, and a scroll wheel of the mouse is operated, the mouse generates a second indication signal, and sends the second indication signal to the gimbal 200.

In some exemplary embodiments, the gimbal 200 includes a second control part, and the second indication signal is generated when the second control part is triggered. The second control part may be one of a key, a button, and a knob. For example, the second control part is a key, and when a user presses the second control part, the second control part generates the second indication signal. In some examples, the gimbal 200 is a handheld gimbal, and the second control part is disposed on a handle.

In some exemplary embodiments, the first indication signal and the second indication signal are generated by the same control part. In some examples, a user may single-click the control part to generate the first indication signal; and then single-click the control part again to generate the second indication signal. In some examples, a user may single-click the control portion to generate the first indication signal, and double-click the control portion to generate the second indication signal. In some examples, the first control part and the second control part are a same control part. In the embodiment shown in FIG. 4, both the first control part and the second control part are a sleep key(s). In the embodiment shown in FIG. 5, both the first control part and the second control part are a lock key(s).

In some exemplary embodiments, the first indication signal and the second indication signal are generated by different control parts. For example, the first indication signal is generated when the first control part on the gimbal 200 is triggered, and the second indication signal [A3][A4] is generated when the second control part on the gimbal 200 is triggered. The first control part and the second control part are control parts independent of each other.

S702: Switch the communication link between the gimbal 200 and the photographing apparatus 100 from the inactive state to the active state.

After the photographing apparatus 100 is switched from the PC connection mode to the autonomous control mode through the one-key operation described above, if the photographing apparatus 100 needs to be restored to the PC connection mode, only the external device or the second control part needs to be operated with. That is, the photographing apparatus 100 is switched from the autonomous control mode to the PC connection mode through the one-key operation. Thus, the operation process is simple, convenient, and quick.

By means of restoring a port on the gimbal 200 for connection to the photographing apparatus 100 from an inactive port to an active port, the communication link between the gimbal 200 and the photographing apparatus 100 can be switched from the inactive state to the active state. Specifically, an input level of the enable end of the port is raised. Certainly, the communication link between the gimbal and the photographing apparatus may be switched from the inactive state to the active state in another manner.

Figure 4:
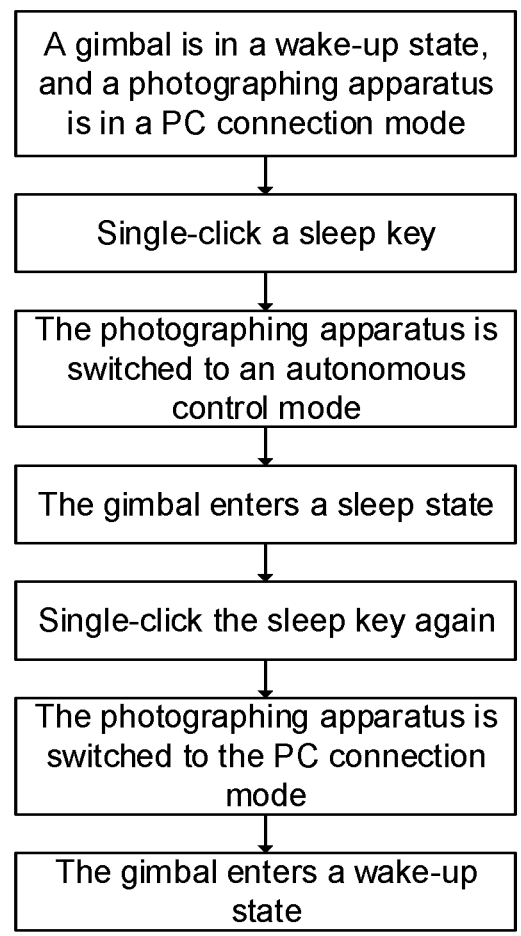
FIG. 4 is a method flowchart of a control method for a photographing apparatus according to another embodiment of the present disclosure.

In some exemplary embodiments, the second indication signal is used for instructing the gimbal 200 to switch from a third state to a fourth state. For example, the third state is a sleep state, and the fourth state is a wake-up state. As shown in FIG. 4, in the case where the gimbal 200 is in the sleep state and the photographing apparatus 100 is in the autonomous control mode, when the sleep key is single-clicked, the sleep key generates a second indication signal to switch the communication link between the gimbal 200 and the photographing apparatus 100 from the inactive state to the active state, so that the photographing apparatus 100 is switched from the autonomous control mode to the PC connection mode, and the gimbal 200 is switched from the sleep state to the wake-up state. Certainly, the third state and the fourth state may alternatively be other states of the gimbal 200.

Figure 5:
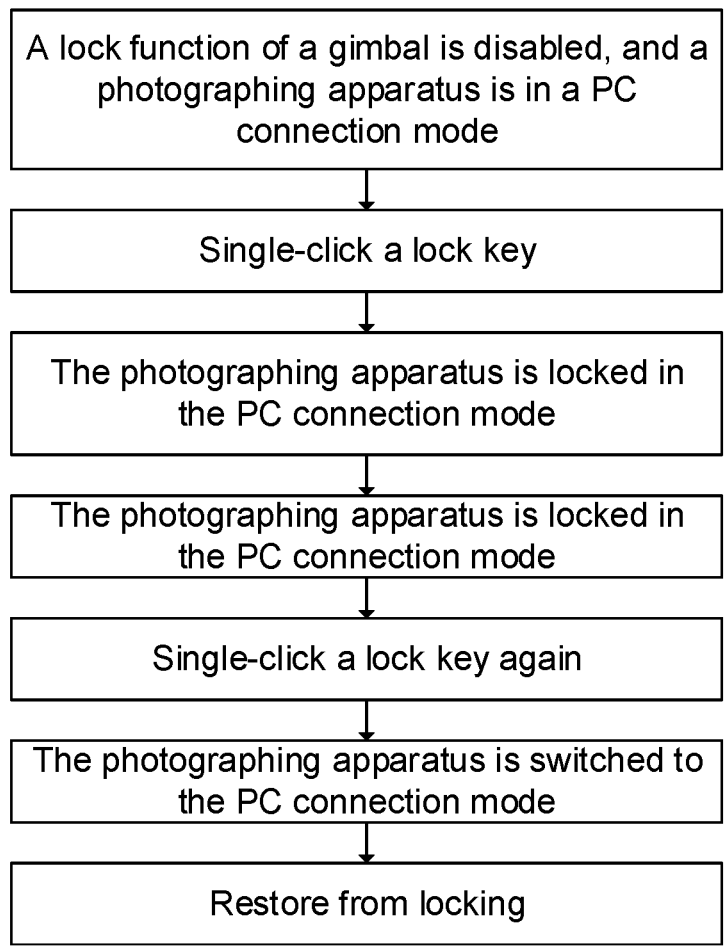
FIG. 5 is a method flowchart of a control method for a photographing apparatus according to another embodiment of the present disclosure.

In some exemplary embodiments, the second indication signal is used for instructing to release a currently locked operation of the photographing apparatus 100. That is, the second indication signal is a signal for disabling a lock function. As shown in FIG. 5, in the case where the lock function of the gimbal 200 is enabled and the photographing apparatus 100 is locked in the PC connection mode, when the lock key is single-clicked, the lock key generates a second indication signal to switch the communication link between the gimbal 200 and the photographing apparatus 100 from the inactive state to the active state, so that the photographing apparatus 100 is switched to a state in which the locking of the PC connection mode is released, and the lock function of the gimbal 200 is disabled. The current operation includes video recording or photographing. Certainly, the current operation may alternatively be another operation.

Further, when the second indication signal is used for instructing to release the currently locked operation of the photographing apparatus 100, the control method for the photographing apparatus further includes: when the second indication signal is detected, restoring a function of the photographing apparatus 100 that is prohibited when the gimbal 200 locks the photographing apparatus 100 to the currently locked operation, thereby helping a user use a function of the photographing apparatus 100. Still further, after the detecting of the second indication signal and prior to the restoring of the function of the photographing apparatus 100 that is prohibited when the gimbal 200 locks the photographing apparatus 100 to the currently locked operation, the control method for the photographing apparatus further includes: saving current state information of the photographing apparatus 100. The saved current state information of the photographing apparatus 100 may be state information of the photographing apparatus 100 that is often used by the user. When the photographing apparatus 100 is locked next time, the photographing apparatus 100 may be set to the saved current state information of the photographing apparatus 100, for easy use by the user.

In some exemplary embodiments, when the second indication signal is used for instructing the gimbal 200 to switch from the third state to the fourth state, the control method for the photographing apparatus further includes: when the second indication signal is detected, initializing the photographing apparatus 100, so that a communication connection between the gimbal 200 and the photographing apparatus 100 is realized. The initializing of the photographing apparatus 100 may include operations such as installing drives of the gimbal 200 and the photographing apparatus 100, and setting a parameter(s) of the photographing apparatus 100. Further, after the initializing of the photographing apparatus 100, the control method for the photographing apparatus further includes: restoring state information of the photographing apparatus 100 to the state information of the photographing apparatus 100 obtained when last time the communication link between the gimbal 200 and the photographing apparatus 100 is switched from the active state to the inactive state. Such a setting can restore the state information of the photographing apparatus 100 to state information of the photographing apparatus 100 that is often used by a user, thereby helping the user use the gimbal 200 to control the photographing apparatus 100.

Figure 8:
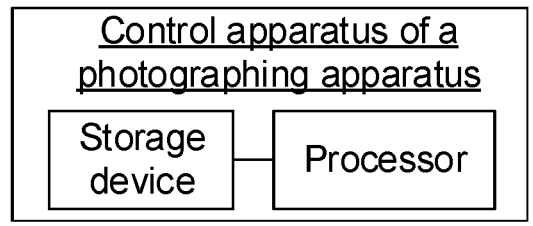
FIG. 8 is a structural block diagram of a control apparatus for a photographing apparatus according to some exemplary embodiments of the present disclosure.

Corresponding to the control method for the photographing apparatus in the foregoing embodiments, some exemplary embodiments of the present disclosure further provide a control apparatus for a photographing apparatus. As shown in FIG. 8, the control apparatus for the photographing apparatus includes a storage device(s) and one or more processors.

The storage device(s) is configured to store a program instruction(s). The one or more processors are configured to invoke the program instruction(s) stored in the storage device. When the program instruction(s) is executed, the one or more processors are configured to individually or collectively perform the following operations: detecting a first indication signal; and switching a communication link between a gimbal 200 and a photographing apparatus 100 from an active state switch to an inactive state, so that the photographing apparatus 100 can be autonomously controlled.

The processor(s) may implement the control method for the photographing apparatus in the embodiments shown in FIG. 3 to FIG. 7 of the present disclosure. The control apparatus for the photographing apparatus in these embodiments may be described by referring to the control method for the photographing apparatus in the foregoing embodiments.

The processor(s) in these embodiments may be a gimbal controller, or may be an independent controller disposed on the gimbal 200.

The storage device(s) may include a volatile memory, such as a random-access memory (RAM); or the storage device may include a non-volatile memory, such as a flash memory, a hard disk drive (HDD), or a solid-state drive (SSD); or the storage device 110 may include a combination of the foregoing types of memories.

The processor(s) may be a central processing unit (CPU). The processor(s) may alternatively be another type of general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor(s) may be any conventional processor, or the like.

Figure 9:
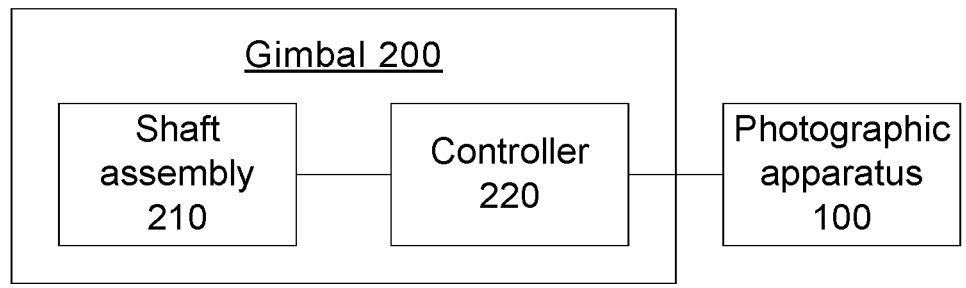
FIG. 9 is a structural block diagram of a gimbal according to some exemplary embodiments of the present disclosure.

Some exemplary embodiments of the present disclosure further provides a gimbal. Referring to FIG. 9, the gimbal 200 includes a carrying part (not shown), a shaft assembly 210, and a controller 220. The carrying part is configured to mount a photographing apparatus 100. The shaft assembly 210 is configured to secure the carrying part. The controller 220 is in communication connection with the shaft assembly 210. In some exemplary embodiments, communication between the gimbal 200 and the photographing apparatus 100 is implemented through the communication connection between the controller 220 and the photographing apparatus 100.

The controller 220 is configured to perform the following operations: detecting a first indication signal; and switching a communication link between the gimbal 200 and the photographing apparatus 100 from an active state switch to an inactive state, so that the photographing apparatus 100 can be autonomously controlled.

The controller 220 may implement the control method for the photographing apparatus in the embodiments shown in FIG. 3 to FIG. 7 of the present disclosure. The gimbal 200 in some exemplary embodiments may be described by referring to the control method for the photographing apparatus in the foregoing embodiment.

The controller 220 may be a CPU. The controller 220 may alternatively be another general purpose processor, a DSP, an ASIC, an FPGA or another programmable logic device, a discrete gate or transistor logic device, a discrete hardware component, or the like. The general purpose processor may be a microprocessor, or the controller 220 may be any conventional processor, or the like.

Figure 10:
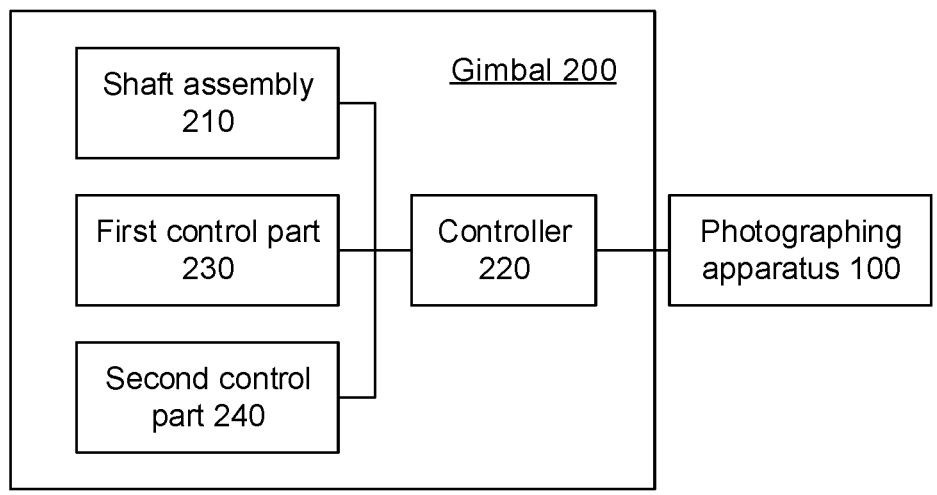
FIG. 10 is a structural block diagram of a gimbal according to another embodiment of the present disclosure.

Referring to FIG. 10, the gimbal 200 may further include a first control part 230. The first control part 230 is electrically connected to the controller 220. A first indication signal is generated when the first control part 230 is triggered. The first indication signal generated by the first control part 230 can be obtained by the controller 220. In some examples, the gimbal 200 is a handheld gimbal, and the first control part 230 is disposed on a handle of the gimbal 200. Certainly, the first control part 230 may alternatively be disposed at another location on the gimbal 200. The first control part 230 may be a key, a button, or a knob, or may be of another type.

Still referring to FIG. 10, the gimbal 200 may further include a second control part 240. The second control part 240 is electrically connected to the controller 220. A second indication signal is generated when the second control part 240 is triggered. The second indication signal generated by the second control part 240 can be obtained by the controller 220. In some examples, the gimbal 200 is a handheld gimbal, and the second control part 240 is disposed on a handle of the gimbal 200. Certainly, the second control part 240 may alternatively be disposed at another location on the gimbal 200. The second control part 240 may be a key, a button, or a knob, or may be of another type.

The first control part 230 and the second control part 240 may be a same control part, or may be control parts independent from each other.

In addition, some exemplary embodiments of the present disclosure further provides a computer readable storage medium to store a computer program(s). When the program is executed by a processor(s), the steps of the control method for the photographing apparatus in the foregoing embodiments are implemented.

The computer readable storage medium may be an internal storage unit, such as a hard disk or memory, of the gimbal or the control apparatus for the photographing apparatus in any one of the foregoing embodiments. The computer readable storage medium may alternatively be an external storage device of the gimbal or the control apparatus for the photographing apparatus, such as a plug-in hard disk, a smart media card (SMC), an SD card, or a flash card equipped on the device. Further, the computer readable storage medium may alternatively include both an internal storage unit and an external storage device of the gimbal or the control apparatus for the photographing apparatus. The computer readable storage medium is configured to store the computer program(s) and another program(s) and data that are required by the gimbal or the control apparatus for the photographing apparatus, or may be configured to temporarily store data that is output or to be output.

A person of ordinary skill in the art may understand that all or some of the procedures in the methods of the foregoing embodiments may be implemented by a computer program instructing related hardware. The program may be stored in a computer readable storage medium. When the program is executed, the procedures in the embodiments of the foregoing methods may be performed. The storage medium may be a magnetic disk, an optical disc, a read-only memory (ROM), a RAM, or the like.

The foregoing disclosure is merely some exemplary embodiments of the present disclosure, and certainly cannot be used to limit the scope of protection of the present disclosure. Therefore, equivalent changes made in accordance with the claims of the present disclosure shall still fall within the scope of protection of the present disclosure.

What is claimed is:

1. A method for controlling a photographing apparatus, comprising:
    detecting a first indication signal;
    resetting the photographing apparatus to preset state information, wherein the preset state information is state information of the photographing apparatus before last time the gimbal loads the photographing apparatus;
    unloading at least one of a drive of the photographing apparatus and a drive of the gimbal to disconnect the gimbal from the photographing apparatus; and
    switching a communication link between the photographing apparatus and a gimbal on which the photographing apparatus is mounted from an active state to an inactive state, wherein,
    in the active state, the photographing apparatus is controlled by the gimbal, and
    in the inactive state, the photographing apparatus is autonomously controlled.

2. The method according to claim 1, wherein
    the first indication signal is sent by an external device configured to communicate with the gimbal, or
    the first indication signal is generated by a first control part of the gimbal.

3. The method according to claim 1, wherein the first indication signal instructs the gimbal to switch from a first state to a second state.

4. The method according to claim 3, wherein the first state is a wake-up state, and the second state is a sleep state.

5. The method according to claim 1, wherein the first indication signal instructs to lock the photographing apparatus to a current operation.

6. The method according to claim 5, wherein the current operation includes at least one of video recording or photographing.

7. The method according to claim 6, further comprising:
    prohibiting the photographing apparatus from performing an operation other than the current operation upon detecting the first indication signal.

8. The method according to claim 1, wherein the gimbal is in communication with the photographing apparatus through one of at least two communication links between the gimbal and the photographing apparatus.

9. The method according to claim 8, wherein
the at least two communication links between the gimbal and the photographing apparatus include a first communication link and a second communication link, and
the first indication signal instructs to switch from the first communication link to the second communication link.

10. The method according to claim 9, wherein
the first communication link is one of a wired communication link and a wireless communication link, and
the second communication link is the other one of the wired communication link and the wireless communication link.

11. The method according to claim 9, further comprising:
connecting the photographing apparatus and an external device through the wireless communication link as the second communication link.

12. The method according to claim 1, further comprising:
detecting a second indication signal; and
switching the communication link between the gimbal and the photographing apparatus from the inactive state to the active state.

13. The method according to claim 12, wherein the second indication signal is sent by an external device configured to communicate with the gimbal; or
the second indication signal is generated by a second control part of the gimbal.

14. The method according to claim 12, wherein the second indication signal instructs the gimbal to switch from a third state to a fourth state.

15. The method according to claim 14, wherein the third state is a sleep state, and the fourth state is a wake-up state.

16. The method according to claim 12, wherein the second indication signal instructs to release a currently locked operation of the photographing apparatus.

17. An apparatus, comprising:
at least one storage medium storing a set of instructions for controlling a photographing apparatus; and
at least one processor in communication with the at least one storage medium, wherein during operation, the at least one processor executes the set of instructions to:
detect a first indication signal,
reset the photographing apparatus to preset state information, wherein the preset state information is state information of the photographing apparatus before last time the gimbal loads the photographing apparatus,
unloading at least one of a drive of the photographing apparatus and a drive of the gimbal to disconnect the gimbal from the photographing apparatus, and
switch a communication link between the photographing apparatus and a gimbal on which the photographing apparatus is mounted from an active state to an inactive state, wherein,
in the active state, the photographing apparatus is controlled by the gimbal, and
in the inactive state, the photographing apparatus is autonomously controlled.

18. A gimbal, comprising:
a carrying part to mount a photographing apparatus;
a shaft assembly to secure the carrying part; and
a controller in communication with the shaft assembly, wherein
the controller is configured to:
detect a first indication signal,
reset the photographing apparatus to preset state information, wherein the preset state information is state information of the photographing apparatus before last time the gimbal loads the photographing apparatus,
unloading at least one of a drive of the photographing apparatus and a drive of the gimbal to disconnect the gimbal from the photographing apparatus, and
switch a communication link between the photographing apparatus and a gimbal on which the photographing apparatus is mounted from an active state to an inactive state, wherein,
in the active state, the photographing apparatus is controlled by the gimbal, and
in the inactive state, the photographing apparatus is autonomously controlled.

* * * * *